(12) United States Patent
Cozzo et al.

(10) Patent No.: US 7,389,099 B2
(45) Date of Patent: Jun. 17, 2008

(54) METHOD AND APPARATUS FOR CANCELING INTERFERENCE FROM HIGH POWER, HIGH DATA RATE SIGNALS

(75) Inventors: Carmela Cozzo, Cary, NC (US); Yi-Pin Wang, Cary, NC (US); Håkan B Eriksson, Täby (CH); Gregory E. Bottomley, Cary, NC (US); Ali S. Khayrallah, Cary, NC (US)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 516 days.

(21) Appl. No.: 11/112,578

(22) Filed: Apr. 22, 2005

(65) Prior Publication Data

US 2006/0240794 A1    Oct. 26, 2006

(51) Int. Cl.
*H04B 1/18* (2006.01)
(52) U.S. Cl. .................. 455/295; 455/63.1; 455/522; 370/335; 370/342; 375/147; 375/148
(58) Field of Classification Search ............... 455/295, 455/63.1, 522; 375/147, 148; 370/335, 370/342
See application file for complete search history.

(56) References Cited

U.S. PATENT DOCUMENTS 6,693,982 B1    2/2004    Naguib et al.

2002/0131479 A1    9/2002    Butler et al.
2005/0063345 A1*   3/2005    Wu et al. ................... 370/335
2005/0174981 A1*   8/2005    Heath et al. ................ 370/342
2006/0141933 A1    6/2006    Smee et al.
2006/0142041 A1*   6/2006    Tomasin et al. ............ 455/522

FOREIGN PATENT DOCUMENTS

EP           1432134 A1    6/2004
WO   WO 2005036849 A1    4/2005

* cited by examiner

*Primary Examiner*—Sanh D. Phu

(57) ABSTRACT

A method and apparatus in a radio receiver for canceling interference from a high power, high data rate signal received in a combined signal that includes a contribution from the high power signal and a contribution from a lower power signal. It is first determined whether the high power signal was correctly received. A CRC checksum may be used to determine whether the high power signal was received with a good reliability. Thereafter, the contribution of the high power signal is removed from the received signal only if the high power signal was correctly received. The contribution of the high power signal may be removed by hard-subtracting the contribution of the high power signal from the received signal if all of the bits of the checksum are correct, and soft-subtracting the contribution of the high power signal from the received signal if most, but not all, of the bits in the checksum are correct.

19 Claims, 10 Drawing Sheets

METHOD AND APPARATUS FOR CANCELING INTERFERENCE FROM HIGH POWER, HIGH DATA RATE SIGNALS

BACKGROUND

The present invention relates to radio communication systems. More particularly, and not by way of limitation, the present invention is directed to a method and apparatus for canceling interference from high power, high data rate signals.

Wideband CDMA (WCDMA) is emerging as the leading global third generation (3G) standard. Specifications are evolving with the introduction of enhancements in the WCDMA uplink that are now part of the Third Generation Partnership Project (3GPP) Release 6. The main requirements driving this evolution are reduced delays, high peak data rate, and higher capacity. To meet these requirements, the following enhancements have been introduced: a short 2 ms Transmission Time Interval (TTI) for data transmissions, fast scheduling, and fast hybrid Automatic Repeat Request (ARQ). To support these enhancements, a new uplink transport channel has been introduced, the Enhanced Dedicated Channel (E-DCH), in which a set of separate channelization codes is utilized for the data and the associated control signaling. The number of channelization codes carrying the E-DCH and their spreading factors depend on the data rate being utilized. The Enhanced Dedicated Physical Control Channel (E-DPCCH), carrying information for hybrid ARQ and transport format, uses a new code. These channels are code-multiplexed with the Dedicated Physical Data Channels (DPDCH) and Dedicated Physical Control Channels (DPCCH) of previous releases that use a 10 ms TTI for circuit switched services such as speech.

FIG. 1 is an illustrative drawing of the frame structures of the physical channels for one enhanced uplink user (User-1) and one voice user (User-2). The E-DCH Dedicated Physical Data Channel (E-DPDCH) is the data channel of the high rate user with TTI equal to 2 ms, including 3 slots. For simplicity, FIG. 1 shows only one data channel, even though, in practice, the number of parallel data channels depends on the transmitted data rate. The E-DPCCH is the control channel that carries information for transport format and hybrid ARQ. The Dedicated Physical Data Channel (DPDCH) and Dedicated Physical Control Channel (CP-DCH) are the channels with 10 ms TTI for circuit-switched services. User-2 is a voice user that transmits with a TTI equal to 10 ms.

Typically, a system includes multiple users transmitting to a base station. Some are data users transmitting at high rates and high powers, and others are low rate users (e.g., voice users). The description herein focuses on a scenario in which there are few high rate users and voice users. A conventional base station receiver typically processes the different users independently. The signal from the receive antennas is converted to baseband samples, and then each user signal is demodulated by a different channel element, which usually includes despreading and combining of different images of the received signal, and error correction decoding.

The fast scheduling allows the base station to control when a terminal can transmit and at what maximum rate. Packet data transmission is bursty, and the required transmit power generally increases with the data rate. Taking into account uplink channel conditions, a small number of high data rate users may be scheduled to transmit simultaneously. When high rate users transmit, the high power level of their transmissions cause the level of interference experienced by other users in the system to suddenly increase, and can exceed an acceptable interference level in the cell. The high interference level degrades the quality of the channel estimation, and detection performance.

In Direct Sequence-CDMA systems, the stream of information to be transmitted is divided into blocks, which are coded, interleaved, and transmitted into modulated symbols. A data signal at the point of transmission is combined with a higher data-rate bit sequence (also known as a chipping code) that divides the data according to a spreading ratio. The redundant chipping code helps the signal resist interference and also enables the original data to be recovered if data bits are damaged during transmission. DS-CDMA is used in second and third generation digital cellular systems such as WCDMA, cdma2000, and IS-95. DS-CDMA is also used in certain WLAN systems.

The conventional receiver for DS-CDMA systems is the Rake receiver. The Rake receiver is a matched filter, matched to the operations of spreading, pulse shape filtering, and channel filtering. This filter maximizes the signal-to-noise ratio at its output when the interference plus noise is white. The combining weights of a Rake receiver are given by the vector of the channel coefficients. In the presence of colored interference, as for example the interference generated by one or a few high data rate users, receiver performance degrades substantially because a Rake receiver models interference as white noise.

A generalized Rake (G-Rake) receiver models the interference as colored noise. A G-Rake receiver is described more completely in G. E. Bottomley et al., "A Generalized Rake Receiver for Interference Suppression," IEEE J. Sel. Areas Commun., vol. 18, pp. 1536-1545, August 2000. The combining weights are given by the vector of the channel coefficients multiplied by the inverse of the correlation matrix of the interference plus noise. The combining operation can be interpreted as an operation of matched filtering in colored noise after despreading. Although a G-Rake receiver has the capability of effectively suppressing interference, further improvement is possible.

To suppress interference, a Linear Minimum Mean Square Error (LMMSE) receiver may also be used (also referred to as an MMSE chip equalizer). This receiver is equivalent to a G-Rake receiver, in the sense that both receivers perform filtering and correlation operations, but in a different order. An LMMSE receiver replaces Rake combining with filtering before despreading, so that only one correlator is needed instead of one correlator per path.

FIG. 2 is a flow diagram illustrating the steps of an existing method of interference reduction in a multi-user environment. Receivers based on multi-user detection techniques have been found to be effective in reducing interference. In FIG. 2, the interference is reduced by serial cancellation, i.e., subtraction of the users' signals in order of decreasing signal strengths. At step 21, the receiver receives a signal from multiple users of varying power levels. At step 22, the highest power user is selected, and at step 23, the selected user is demodulated (or detected). At step 24, the contribution of the highest power user is subtracted. At step 25, the receiver then selects the next strongest user. The process may then be repeated to demodulate and remove the next highest power user, and so on. In an alternative multi-user detection technique known as parallel subtraction, interference signals are created and subtracted to produce a less interfered signal for each user. The users may also be jointly demodulated. The reduction of interference in multi-user receivers, however, comes at the expense of computational complexity that grows linearly or exponentially with the number of users.

Thus, a shortcoming of prior art solutions is the trade-off between performance and complexity. Some solutions are theoretically very effective in reducing interference, but their complexity becomes prohibitive for actual implementation. Other solutions are less complex and thus more suitable for implementation, but their performance is reduced in exchange for the reduced complexity.

SUMMARY

In one aspect, the present invention is directed to a method in a radio receiver for canceling interference from a first user signal received in a combined signal that includes a contribution from a first user and a second user. The method includes determining whether the first user signal was correctly received; and removing the contribution of the first user signal from the received combined signal only upon determining that the first user signal was correctly received. The first user signal may be a high power signal, and the second user signal may be a low power signal relative to the first user signal. Additionally, the first user signal may include a cyclic redundancy check (CRC) checksum, which may be used to determine whether the first user signal was correctly received. Further, the step of removing the contribution of the first user signal may include hard-subtracting the contribution of the high power signal from the received signal if all of the bits of the checksum are correct, and soft-subtracting the contribution of the high power signal from the received signal if some of the bits in the checksum are not correct, but the number of correct bits in the checksum exceeds a predefined threshold.

If both the high power signal and the lower power signal belong to a single user that transmits on both a high power, high data rate channel and a lower power voice channel, the method may also include re-encoding the high power signal to create symbols; and utilizing the symbols of the high power signal as pilot symbols to improve channel coefficient estimation to help detect the lower power voice signal coming from the same user.

In one embodiment, the receiver is a generalized Rake (G-Rake) receiver, and the combined signal may include contributions from a plurality of signals of varying power levels, with the highest power signal being from the first user. In this case, the method may also include adjusting parameters of the G-Rake receiver to exclude the first user signal; utilizing the G-Rake receiver to estimate interference statistics associated with the remaining interference; and utilizing the estimated interference statistics to suppress the remaining interference.

In yet another aspect, the present invention is directed to a method of canceling interference for a second user's voice signal from high power signals received in a combined signal that includes contributions from a plurality of signals of varying power levels, wherein the signals include a high power signal from a first user, a low power voice signal from the second user, and a high power signal from the second user as well. The method includes initially demodulating the second user's high power signal, removing the contribution of the second user's high power signal from the received signal, and determining whether the first user's high power signal was correctly received. If the first user's high power signal was not correctly received, the method retains the contribution of the first user's high power signal in the received signal, utilizes the G-Rake receiver to estimate interference statistics associated with the first user's high power signal, and utilizes the statistics to suppress the first user's high power signal in the demodulation of the second user's voice signal. If the first user's high power signal was correctly received, the method removes the contribution of the first user's high power signal from the received signal, utilizes the G-Rake receiver to estimate interference statistics associated with the remaining interference, and utilizes the estimated interference statistics to suppress the remaining interference in the demodulation of the second user's voice signal.

In still yet another aspect, the present invention is directed to a method in a receiver for canceling interference from a highest power signal received in a combined signal that includes contributions from a plurality of signals of varying power levels, wherein the highest power signal is transmitted in compliance with a data transmission protocol that utilizes automatic repeat request (ARQ) to retransmit data packets that are not correctly received. The method includes determining whether a highest power data packet was correctly received after the ARQ process; and upon determining that the highest power data packet was correctly received, removing the contribution of multiple ARQ transmissions associated with the highest power data packet from the received signal.

In still yet another aspect, the present invention is directed to an apparatus in a radio receiver for canceling interference from a first user signal received in a combined signal that includes a contribution from a first user and a second user. The apparatus includes an error detection mechanism for determining whether the first user signal was correctly received; and subtracting means for removing the contribution of the first user signal from the received combined signal. The subtracting means removes the contribution of the first user signal only upon determining that the first user signal was correctly received. The first user signal may be a high power signal, and the second user signal may be a low power signal relative to the first user signal. In one embodiment, the error detection mechanism includes means for forming a CRC checksum for the first user signal; and means for determining whether the CRC checksum for the first user signal is correct.

In still yet another aspect, the present invention is directed to an apparatus in a receiver for canceling interference from a highest power signal received in a combined signal that includes contributions from a plurality of signals of varying power levels, wherein the highest power signal is transmitted in compliance with a data transmission protocol that utilizes ARQ to retransmit data packets that are not correctly received. The apparatus includes error detecting means for determining whether a highest power data packet was correctly received after the ARQ process; and subtracting means for removing the contribution of multiple ARQ transmissions associated with the highest power data packet from the received signal responsive to an indication from the error detecting means that the highest power data packet was correctly received.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION

The present invention addresses the important problem of interference suppression in radio systems such as DS-CDMA systems. In one embodiment, the invention is specifically directed to canceling interference generated by one or a few high data rate users in either the uplink or downlink, thereby increasing capacity and/or improving reception quality. The invention is of particular interest for the enhanced WCDMA uplink, in which the receiver demodulates both high-rate user signals and low-rate user signals such as voice signals. As the number of users varies over time, the level of interference experienced by each user in the system changes. High data rate users transmit with higher power than voice users, and consequently a few high-rate users can cause a substantial increase in the interference level seen by other users. Also, high-rate transmissions often occur in bursts since users are scheduled to transmit in a given time interval such as 2 ms. Voice users in the system then experience a level of interference that suddenly changes over time, and the range of variation can be large. The interference due to other voice users is more constant over time.

Figure 3:
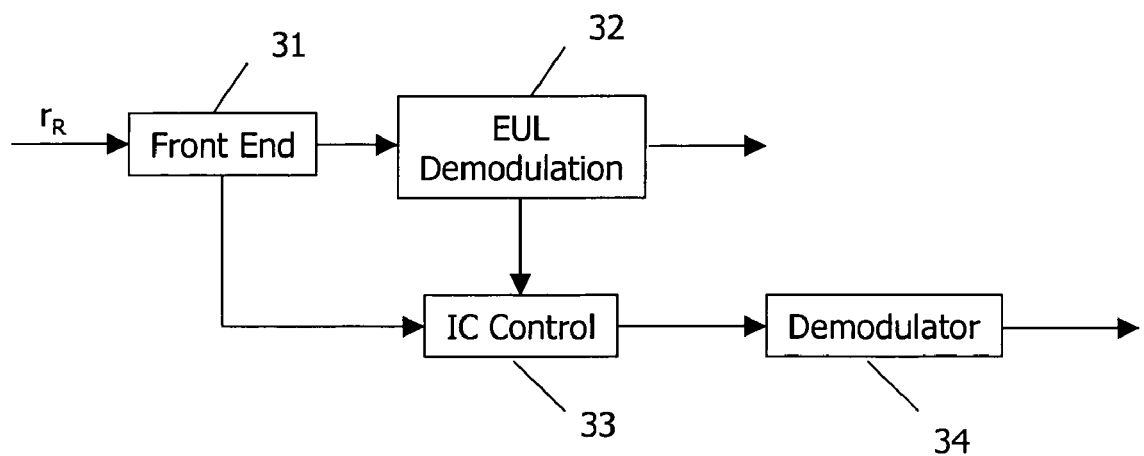
FIG. 3 is a simplified functional block diagram illustrating one embodiment of the apparatus of the present invention.

FIG. 3 is a simplified functional block diagram illustrating one embodiment of the apparatus of the present invention. In the present invention, high-rate users are demodulated, decoded, and subtracted prior to demodulating other users. Front end processing 31 is applied to the received radio signal, $r_R$, to convert it to baseband samples. For example, the front-end processing may provide four samples per chip for each of two receive antennas. These samples are provided to an enhanced uplink (EUL) demodulation unit 32 for demodulating the EUL or high data rate signal. The demodulation unit demodulates and possibly decodes the EUL signal. In addition, the demodulator produces estimates of the EUL signal before despreading. This may be done by performing Rake or G-Rake demodulation, making hard or soft decisions on the modem symbols, then respreading, chip-pulse-shaping, and channel filtering the result. Preferably this is done after Forward Error Correction (FEC) decoding. The FEC decoder is configured to produce likelihood information regarding the modem bits, as is done as part of turbo decoding so that soft modem symbol estimates can be formed and respread.

The received signal baseband samples and the EUL signal estimate are provided to an interference cancellation (IC) control unit 33. The IC control unit performs interference cancellation in one of a number of ways. One way is to simply subtract the EUL signal estimate from the samples. Another way is to conditionally subtract the signal estimate, depending on whether an error detection code, such as a cyclic redundancy check (CRC), has detected an error. For example, if the CRC detects an error, then no subtraction occurs. Otherwise, subtraction occurs. Note that other forms of error detection may be used, such as other parity check codes or comparing final metrics in a demodulator or decoder to see how confident the receiver is in the detected sequence. From the IC control unit, the signal is supplied to a demodulator 34 for further processing.

The CRC may also be utilized in the EUL demodulation unit. If it checks, then the EUL signal estimate is formed based on hard decisions for the modem bits and there is confidence that the re-encoded bits are correct. If the CRC does not check, then the EUL signal estimate could be formed using soft modem bit estimates. It may help to further scale such estimates by a scaling factor less than one.

Figure 4:
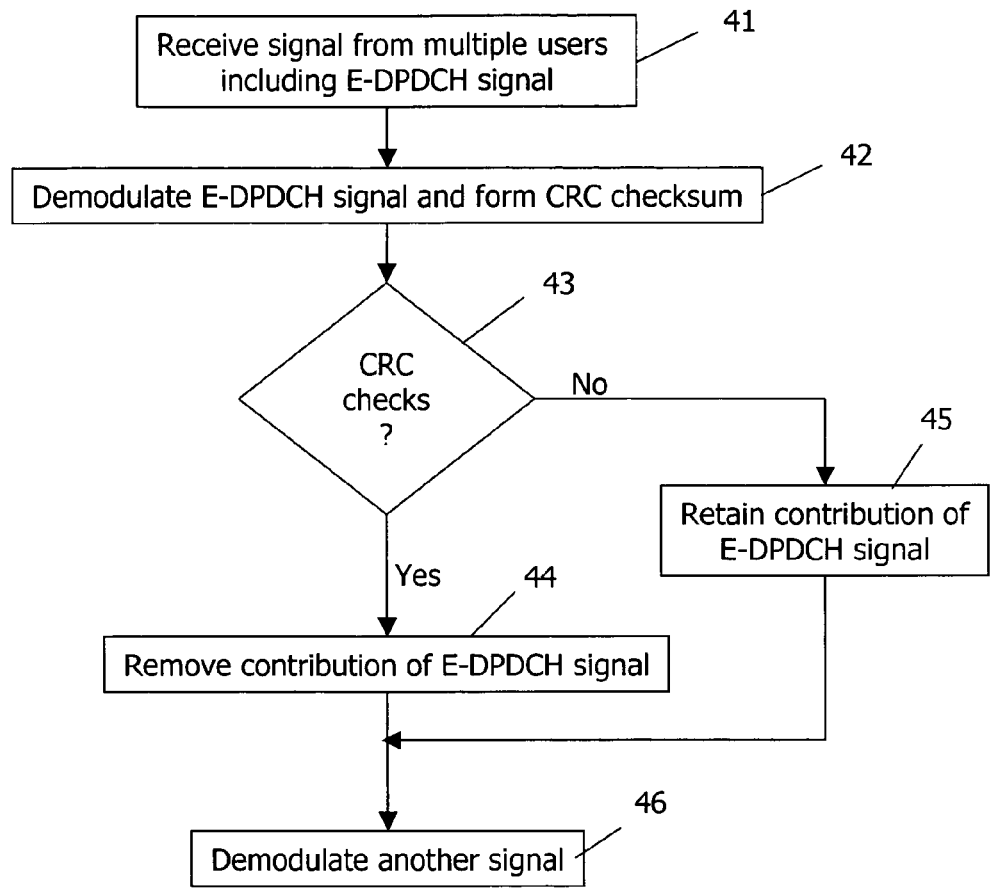
FIG. 4 is a flow diagram illustrating a first embodiment of the method of the present invention.

FIG. 4 is a flow diagram illustrating a first embodiment of the method of the present invention. While existing methods of serial interference cancellation always remove the contribution of the strongest signal, the present invention first determines whether the base station correctly received the high data rate (E-DPDCH) signal, and removes the contribution from the E-DPDCH signal only if the signal was correctly received. The invention recognizes that if the signal was incorrectly received, and is then removed, the process may degrade the signal more than the signal is improved.

Thus, at step 41, the base station receives a signal from multiple users, including an E-DPDCH signal. At step 42, the E-DPDCH signal is demodulated, and a CRC checksum is formed. The E-DPDCH signal normally has both an error correction coding and an error detection coding. The present invention utilizes the error detection coding (for example, a CRC field) to detect at step 43 whether the E-DPDCH signal was correctly received. If the CRC checks (i.e., the E-DPDCH signal was correctly received), the process moves to step 44 and removes the contribution of the E-DPDCH signal from the received signal. After the subtraction, the residual signal is a lot cleaner, and the receiver can then proceed with demodulating or detecting other signals. However, if the CRC does not check (i.e., the E-DPDCH signal was not correctly received), the process moves to step 45 and retains the contribution of the E-DPDCH signal. At step 46, other signals are demodulated. If G-Rake demodulation is used, the noise covariance matrix is then estimated, with or without the E-DPDCH signal, depending on whether it was correctly received.

Figure 5:
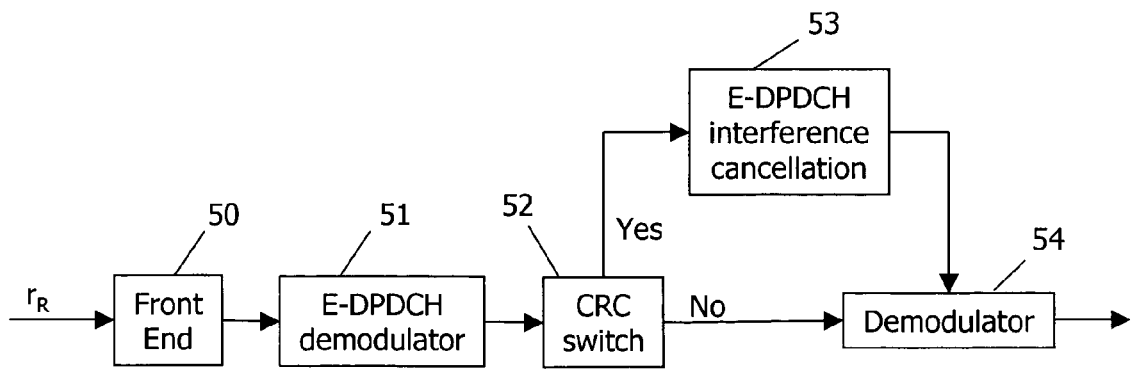
FIG. 5 is a simplified functional block diagram of a receiver apparatus for performing the method illustrated in FIG. 4.

FIG. 5 is a simplified functional block diagram of a receiver apparatus for performing the method illustrated in FIG. 4. The received signal, $r_R$, is first processed in the receiver front end 50. The E-DPDCH signal is then demodulated in E-DPDCH demodulator 51. A CRC checker 52 then acts as a switch to determine whether or not E-DPDCH interference cancellation 53 is performed prior to demodulation of other signals. If the CRC checks, then E-DPDCH interference cancellation is performed, and the residual signal is sent to the demodulator 54 to demodulate other signals. If the CRC does not check, the E-DPDCH signal is not removed, and the entire signal is sent to the demodulator 54.

Figure 6:
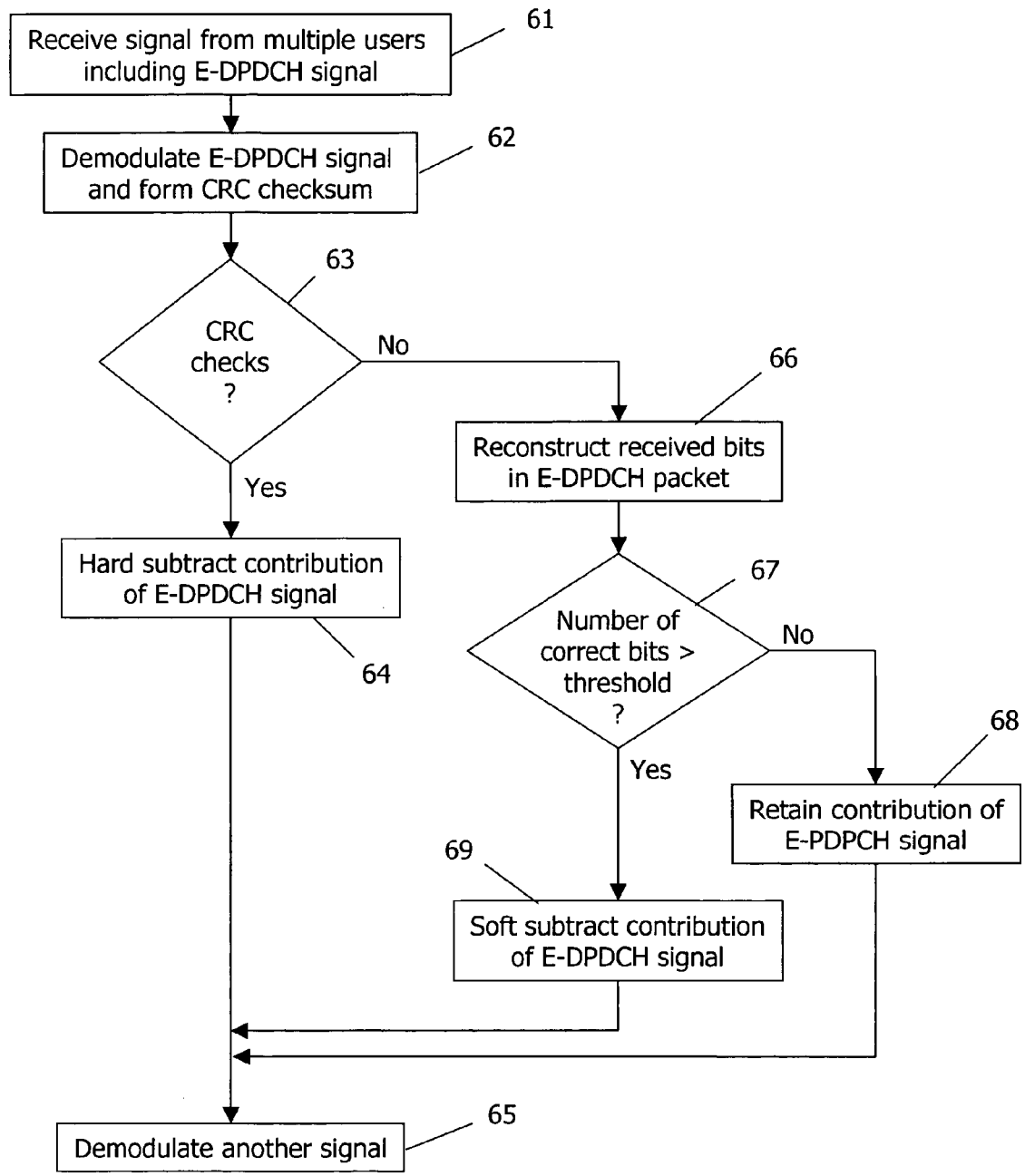
FIG. 6 is a flow diagram illustrating a second embodiment of the method of the present invention.

FIG. 6 is a flow diagram illustrating a second embodiment of the method of the present invention. At step 61, the base station receives a signal from multiple users, including an E-DPDCH signal. At step 62, the E-DPDCH signal is demodulated, and a CRC checksum is formed. At step 63, it is determined whether the CRC for the E-DPDCH signal checks. If so, the process moves to step 64 where the contribution of the E-DPDCH signal is hard-subtracted from the received signal. The residual signal is then used to demodulate another signal at step 65. If the CRC does not check, the process moves to step 66 where the received bits in the E-DPDCH packet are reconstructed (i.e., decoded bits are re-encoded). The re-encoded bits are then analyzed, and it is determined at step 67 whether the number of bits that were correctly received is greater than a predefined threshold. For example, it may be determined whether most of the bits in the E-DPDCH packet were correctly received. If not, the process moves to step 68 where the contribution of the E-DPDCH signal is retained, and the entire received signal is demodulated at step 65. However, if the number of bits that were correctly received is greater than the predefined threshold, the process moves to step 69 where the contribution of the E-DPDCH signal is soft-subtracted from the received signal. In soft-subtraction, rather than removing a bit entirely, it is partially removed by using some intermediate value (e.g., 0.9 rather than +1 or −1). Alternatively, steps 66, 67, and 68 may be omitted and soft subtraction is always used when the CRC does not check.

Figure 7:
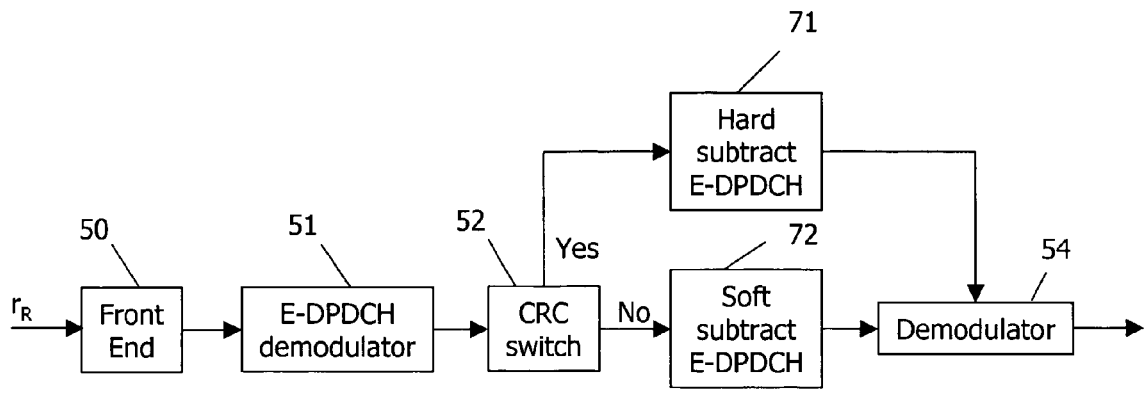
FIG. 7 is a simplified functional block diagram of a receiver apparatus for performing the method illustrated in FIG. 6.

FIG. 7 is a simplified functional block diagram of a receiver apparatus for performing the method illustrated in FIG. 6. The received signal, $r_R$, is first processed in the receiver front end 50, and the E-DPDCH signal is demodulated in the E-DPDCH demodulator 51. A CRC checker 52 then acts as a switch to determine whether to hard-subtract or soft-subtract the contribution of the E-DPDCH signal from the received signal. If the CRC checks, then the contribution of the E-DPDCH signal is subtracted from the received signal by a hard-subtraction module 71, and the residual signal is sent to the demodulator 54 to demodulate other signals. If the CRC does not check, the contribution of the E-DPDCH signal is sent to a soft-subtraction module 72, which determines whether to soft-subtract the E-DPDCH signal from the received signal or retain the contribution of the E-DPDCH signal. The residual or original signal is then sent to the demodulator 54.

The EUL link may also employ a form of ARQ. As a result, a signal may be transmitted more than once before reliable reception is achieved. The second transmission may be a copy of the first or may supply related information. One way to handle this is to treat each transmission separately. A second way is to account for past transmissions, performing for example Chase combining before demodulation to obtain a better E-DPDCH signal estimate. A third way is to account for past and future transmissions by delaying when cancellation is performed. This is reasonable when the transmit time interval (TTI) is much shorter for the E-DPDCH signal than for the other signals. For example, the TTI for the E-DPDCH signal may be 2 ms whereas the other signals have a TTI of 10 ms. If it requires two transmissions of the E-DPDCH signal to pass the CRC check, and the time between transmissions is two TTIs (i.e., 4 ms), then by delaying demodulation of the other signals by four TTIs (i.e., 8 ms) and taking into account other processing delays, both E-DPDCH signals can be canceled and removed accurately from the received signal based on demodulation using one or both images.

Figure 1:
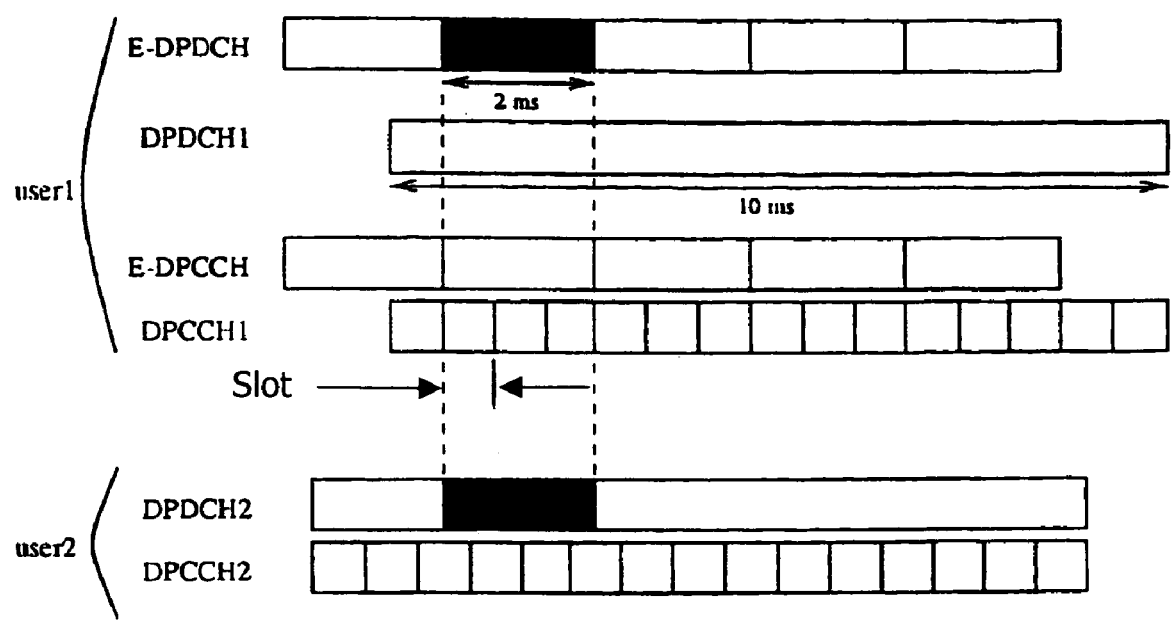
FIG. 1 (Prior Art) is an illustrative drawing of the Transmission Time Intervals (TTIs) in uplink channels for multiple users.
Figure 2:
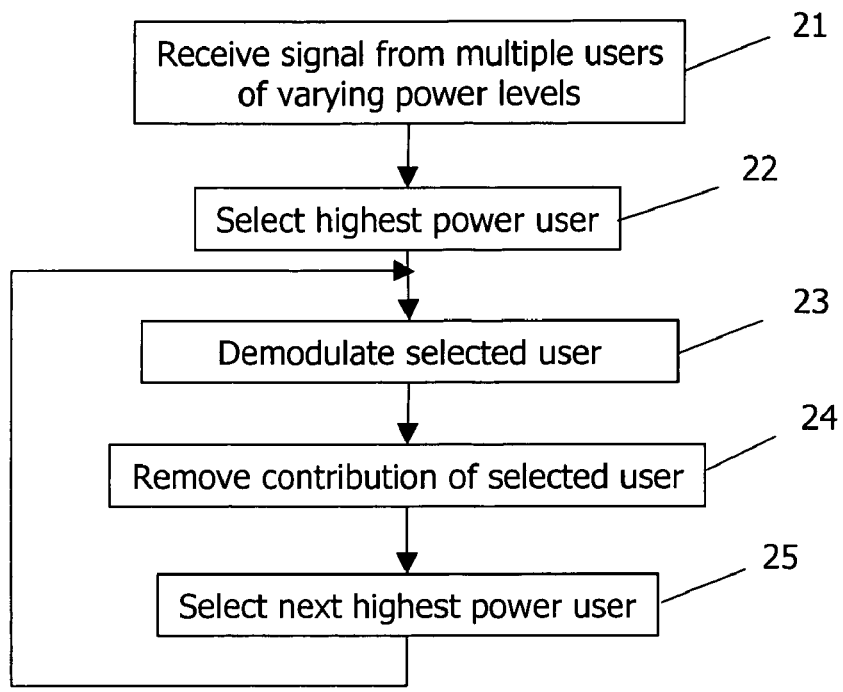
FIG. 2 (Prior Art) is a flow diagram illustrating the steps of an existing method of interference reduction in a multi-user environment.
Figure 8:
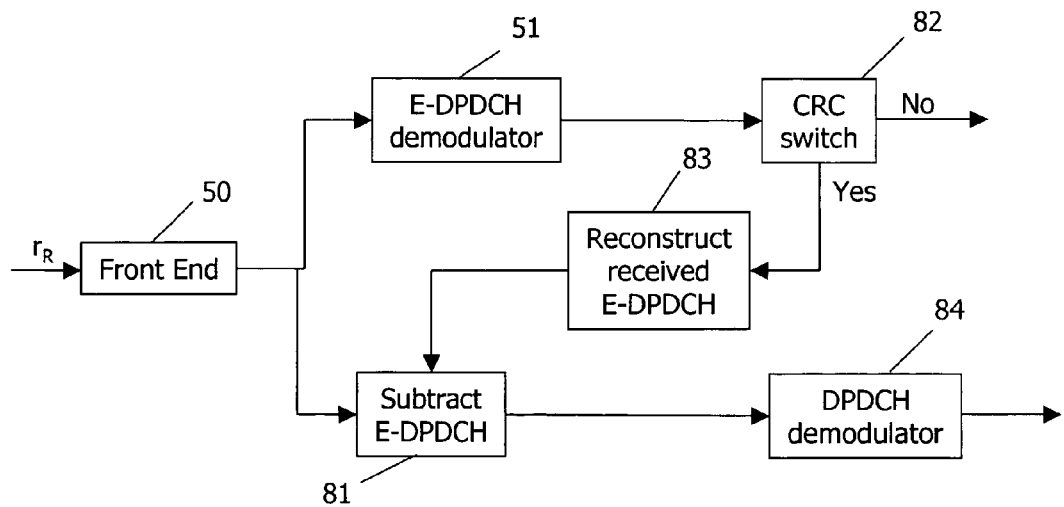
FIG. 8 is a simplified functional block diagram of a receiver apparatus for performing a third embodiment of the method of the present invention.

FIG. 8 is a simplified functional block diagram of a receiver apparatus for performing a third embodiment of the method of the present invention. With reference also to FIG. 1, it is assumed that the high data rate channel of User-1 is scheduled to transmit for four TTIs during the 10 ms TTI of the low data rate User-2. In this embodiment, User-2 removes the interference contribution of User-1 by subtracting the received E-DPDCH signals of each TTI that passes the CRC check. Consider the received signal $r_R$ from the two users. This signal is given by:

$$r_R = r_{E\text{-}DPDCH} + r_{E\text{-}DPCCH} + r_{DPDCH1} + r_{DPCCH1} + r_{DPDCH2} + r_{DPCCH2} + n,$$

where n indicates the noise vector. To simplify the following discussion, $r_{E\text{-}DPCCH}$, $r_{DPDCH1}$, and $r_{DPCCH1}$ are folded to n, as in practice the powers of these signals are much weaker than that of $r_{E\text{-}DPCCH}$. Thus, the received signal can be modeled as:

$$r_R = r_{E\text{-}DPDCH} + r_{DPDCH2} + r_{DPCCH2} + n.$$

If the second 2 ms TTI of User-1 successfully passes the CRC check, the received signal for the second 2 ms TTI is reconstructed and subtracted from $r_R$. The received signal processed by User-2 in that time interval becomes:

$$r = r_R - \check{r}_{E\text{-}DPDCH},$$

where $\check{r}_{E\text{-}DPDCH}$ is the estimated E-DPDCH received signal. Since the level of interference is lower in r than in $r_R$, performance of the voice user (User-2) improves. Note that $\check{r}_{E\text{-}DPDCH}$ is an estimate of the received E-DPDCH signal, because the channel coefficients used in the reconstruction of the signal are estimates from the pilot symbols in DPCCH1. Therefore the subtraction of the E-DPDCH signal is not perfect.

With continuing reference to FIG. 8, the received signal $r_R$ is received from the two users in the receiver front end 50. The signal is sent to both the E-DPDCH demodulator 51 and an E-DPDCH subtraction module 81. Following E-DPDCH demodulation, a CRC switch 82 performs a CRC check. If the CRC checks, the received signal in the E-DPDCH packet is reconstructed (i.e., decoded bits are re-encoded, re-spread, and channel-filtered) by a packet reconstruction module 83. The E-DPDCH subtraction module 81 then subtracts the contribution of the E-DPDCH signal. A DPDCH demodulator 84 then demodulates the residual DPDCH signal. After subtraction, if the voice user (User-2) uses a Rake receiver, the lower level of interference in the received signal for a certain time interval results in a lower interference level in the soft values at the output of the Rake combiner. This improves performance.

If an advanced receiver is used, for example a G-Rake receiver, then a noise covariance matrix must be estimated. The noise covariance matrix depends on the level of interference seen by the receiver and is modeled differently depending upon whether or not the E-DPDCH symbols have been subtracted. For example, if the E-DPDCH signal is not subtracted for a given TTI because the CRC did not check successfully, the noise covariance matrix of a G-Rake receiver can be modeled as:

$$R = E_i R_{E\text{-}DPDCH} + N0 \, R_{AWGN},$$

where $E_i$ is the energy of the E-DPDCH channel, $R_{E\text{-}DPDCH}$ is the correlation matrix contributed by E-DPDCH, N0 is the AWGN power, and $R_{AWGN}$ is the correlation matrix contributed by AWGN. Note that here N0 includes the power of the E-DPCCH, DPDCH1, DPCCH1, DPDCH2, and DPCCH2, as well as other interference present in the received signal. For the time interval corresponding to a TTI in which the E-DPDCH signal has been hard-subtracted, the G-Rake matrix depends only on the noise and is given by:

$$R = N0 \, R_{AWGN}.$$

If other sources of interference exist (for example, self-interference when the intended receiver is not a voice user but transmits at some higher rate with multiple codes and low spreading factor), the correlation matrix that is inverted to compute the combining weights includes additional terms.

Figure 9:
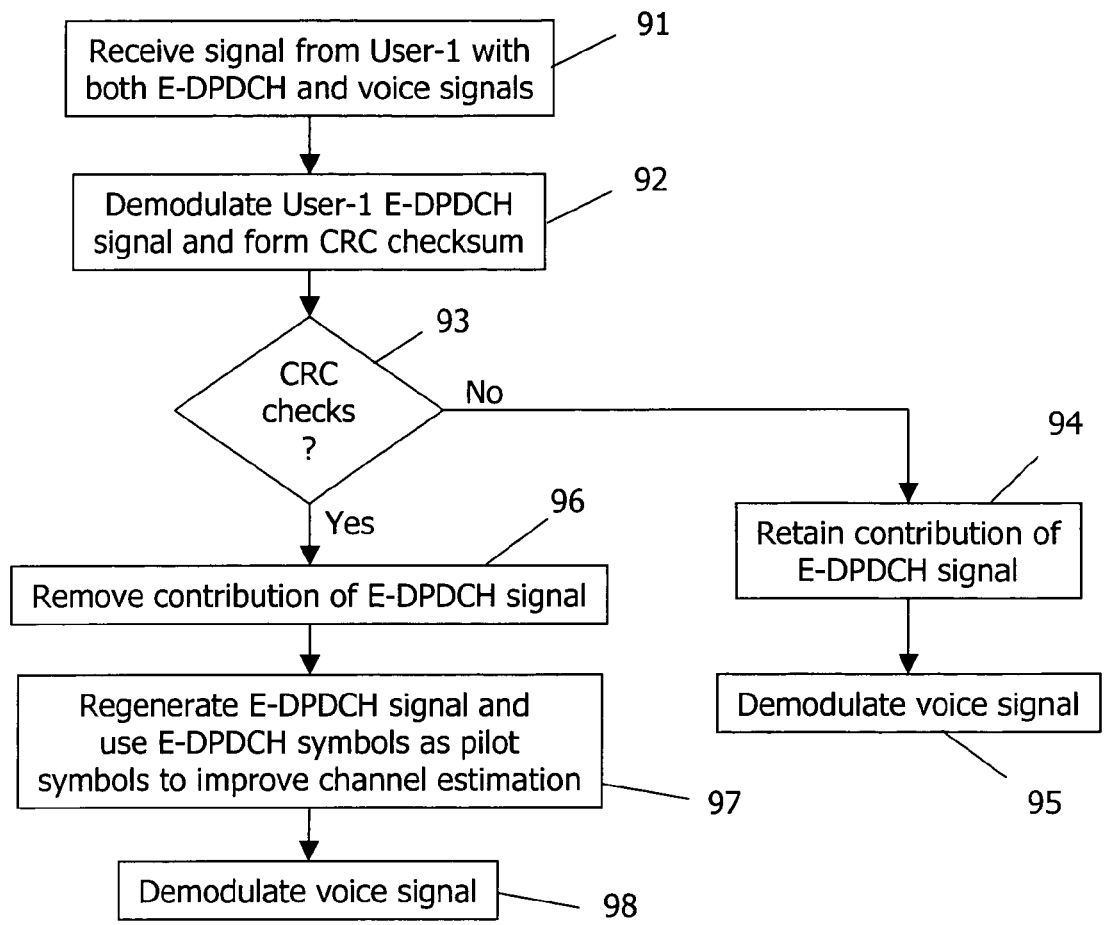
FIG. 9 is a flow diagram illustrating a fourth embodiment of the method of the present invention.

FIG. 9 is a flow diagram illustrating a fourth embodiment of the method of the present invention. In this embodiment, both the E-DPDCH and the DPDCH belong to a single user that transmits on both the high data rate channel and the voice channel. If the E-DPDCH signal passes the CRC check, then the receiver has very good knowledge about the encoded bits of the E-DPDCH signal. In addition to subtracting the E-DPDCH signal from the received signal, the receiver can re-encode the E-DPDCH signal and use the E-DPDCH symbols as pilot symbols to improve the channel coefficient estimation to help more accurately estimate the E-DPDCH signal and better detect the low data rate signal coming from the same user.

The use of known pilot signals to help estimate the channel coefficient is well known. In systems utilizing pilot signals, a portion of the transmitted energy is used to transmit pilot signals that are known quantities so that the receiver can use them as a reference to determine what is happening on the channel. In the present invention, on the other hand, the received signal is not known prior to demodulation and decoding. However, if the E-DPDCH signal passes the CRC check, then a great deal can be learned about conditions on the channel from the encoded bits of the E-DPDCH signal. Since the TTI of the E-DPDCH signal is much shorter than the voice TTI, there is time to use the knowledge gained from the E-DPDCH signal to improve channel estimation before the end of the voice TTI.

Thus, at step 91, a signal is received from User-1 with both an E-DPDCH signal and a voice signal. At step 92, the E-DPDCH signal is demodulated, and a CRC checksum is formed. At step 93, it is determined whether the CRC checks for the E-DPDCH signal. If not, the process moves to step 94, where the contribution of the E-DPDCH signal is retained. The received signal is then demodulated at step 95 and, assuming a G-Rake receiver is utilized, a noise covariance matrix is estimated.

However, if the CRC checks for the E-DPDCH signal, the process moves to step 96 where the contribution of the E-DPDCH signal is removed, and the residual signal is used to demodulate the voice signal. At step 97, the E-DPDCH signal is regenerated, and the E-DPDCH symbols are then utilized as pilot symbols to improve channel estimation for that TTI (before subtraction). The voice signal is then demodulated at step 98.

Figure 10:
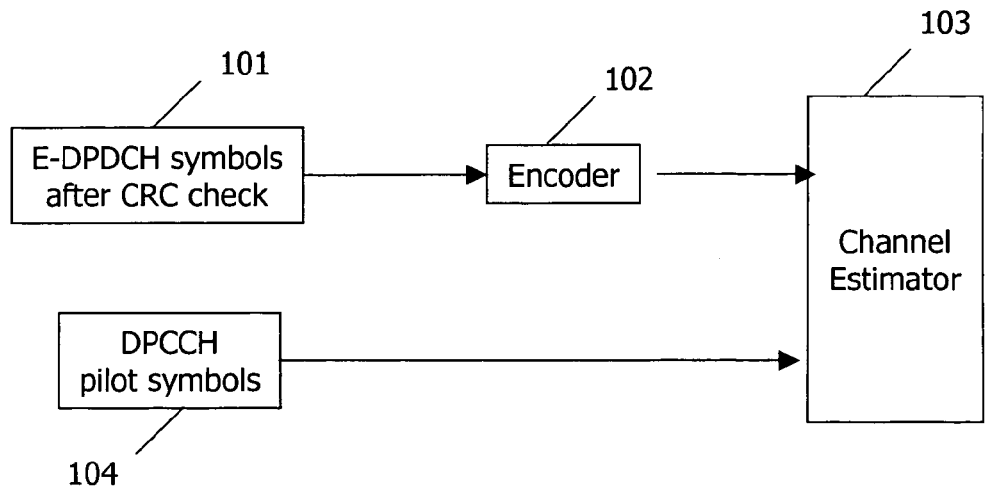
FIG. 10 is a simplified functional block diagram of a receiver apparatus for performing the method illustrated in FIG. 9.

FIG. 10 is a simplified functional block diagram of a receiver apparatus for performing the method illustrated in FIG. 9. After the high data rate E-DPDCH signal 101 passes the CRC check, an encoder 102 re-encodes the signal and passes it to a channel estimator 103. Meanwhile, the low data rate DPCCH signal 104 is received over its longer TTI and is also passed to the channel estimator. Both the E-DPDCH and DPCCH symbols are utilized as pilot symbols in the channel estimator to improve the channel estimation.

Figure 11:
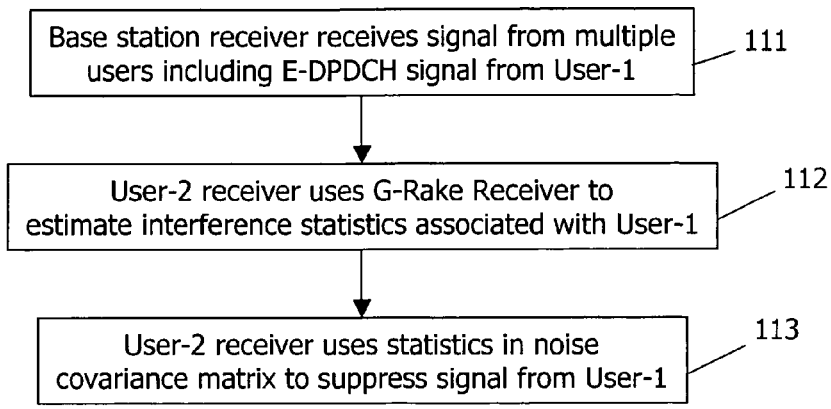
FIG. 11 (Prior Art) is a flow diagram illustrating an existing method of suppressing an interfering signal.

FIG. 11 is a flow diagram illustrating an existing method of suppressing an interfering signal. At step 111, a base station receiver receives a signal from multiple users including an E-DPDCH signal from User-1. At step 112, the User-2 receiver utilizes a G-Rake receiver to estimate interference statistics associated with User-1. Thereafter, at step 113, User-2 utilizes the statistics to suppress the signal from User-1.

Figure 12:
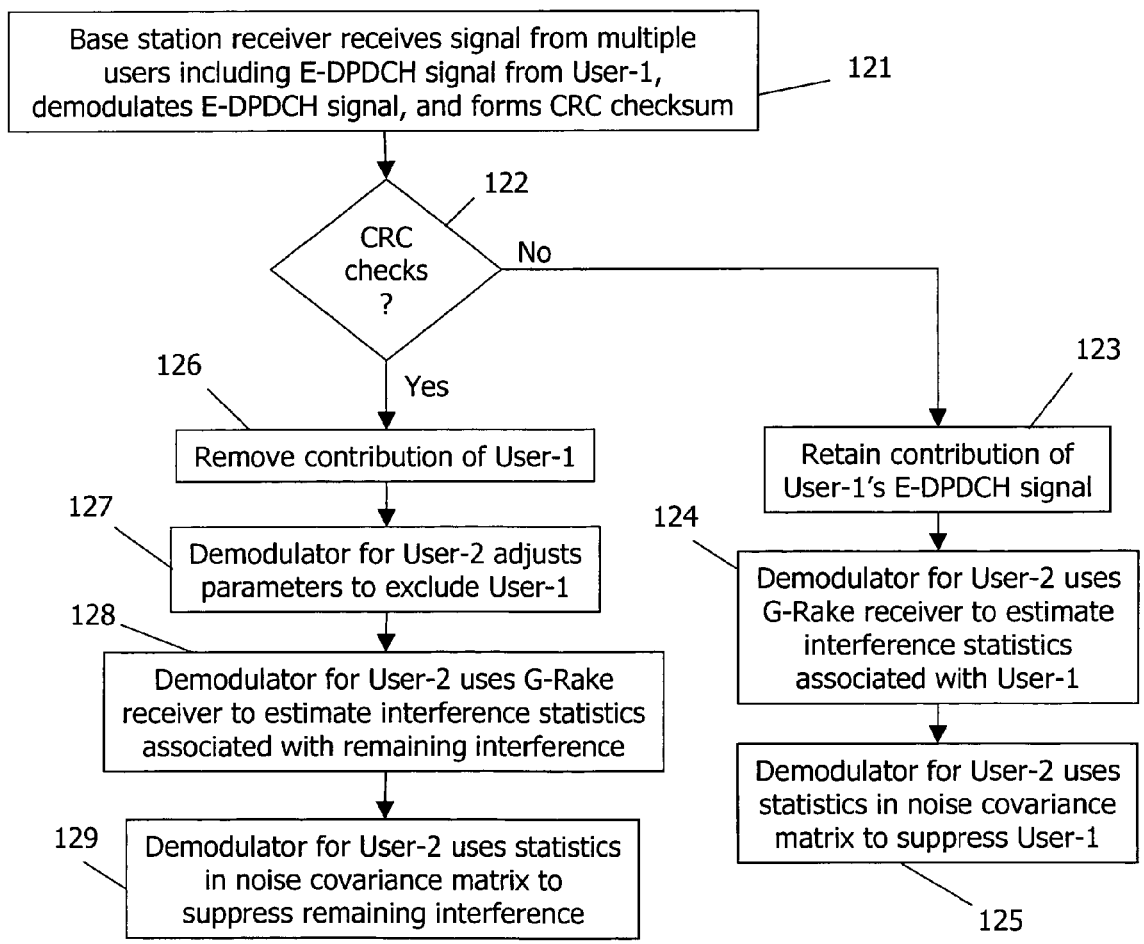
FIG. 12 is a flow diagram illustrating a fifth embodiment of the method of the present invention.

FIG. 12 is a flow diagram illustrating a fifth embodiment of the method of the present invention. In this embodiment, a base station receiver receives a signal at step 121 from multiple users, including an E-DPDCH signal from User-1, and demodulates the E-DPDCH signal and forms a CRC checksum. At step 122, it is determined whether the CRC for the E-DPDCH signal checks. If not, the method utilizes the known process of estimating interference statistics associated with User-1 (including User-1 interference as well as other sources of interference), and using those statistics to suppress the signal from User-1. Thus, if the CRC does not check, the process moves to step 123 where the contribution of User-1's E-DPDCH signal is retained. At step 124, the demodulator for the User-2 signal utilizes a G-Rake receiver to estimate interference statistics associated with User-1. Thereafter, at step 125, the demodulator for the User-2 signal utilizes the estimated interference statistics to suppress the signal from User-1.

However, it the CRC for the E-DPDCH signal checks, the process moves to step 126 where the contribution of User-1's E-DPDCH signal is removed from the received signal. At step 127, the demodulator for the User-2 signal then adjusts the parameters of the G-Rake receiver to exclude User-1. Alternatively, the parameters may be adjusted to partially exclude User-1 if subtraction is not perfect. The demodulator for the User-2 signal can then use its G-Rake receiver and noise covariance matrix to suppress other interference, but does not have to suppress User-1. Thus, at step 128, the demodulator for the User-2 signal utilizes the G-Rake receiver to estimate interference statistics associated with the remaining interference. At step 129, the demodulator for the User-2 signal utilizes the estimated interference statistics to suppress the signal from the remaining interference. Thus, in a broad sense, User-2's demodulation depends on what happened with User-1. If User-1's contribution is subtracted, the demodulator for the User-2 signal takes steps to suppress other interferers; if User-1's contribution is not subtracted, the demodulator for the User-2 signal takes steps to suppress User-1 as well.

Figure 13:
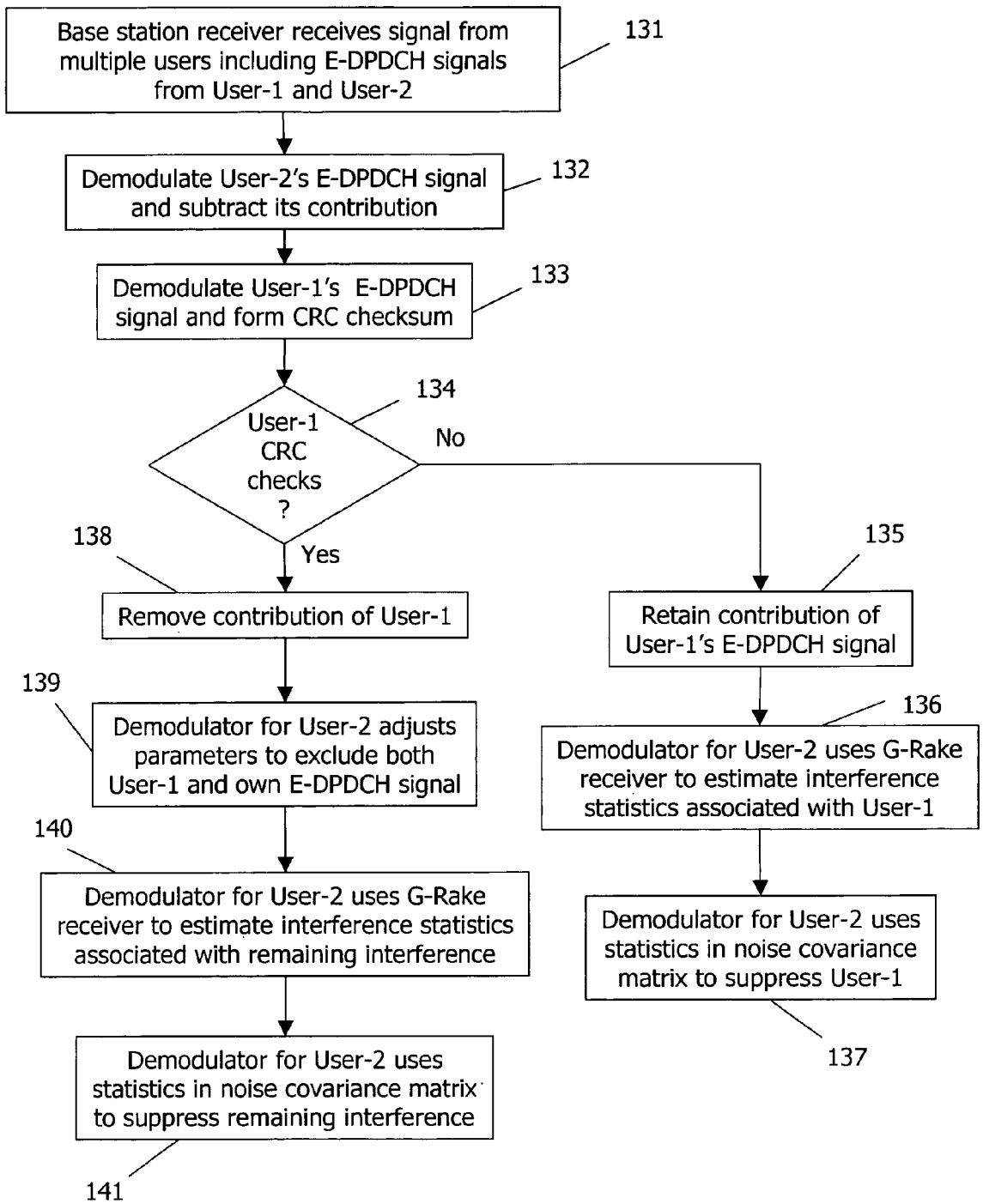
FIG. 13 is a flow diagram illustrating a sixth embodiment of the method of the present invention.

FIG. 13 is a flow diagram illustrating a sixth embodiment of the method of the present invention. In this embodiment, User-2 is both a voice user and an E-DPDCH user, and a base station receiver processes User-2's low power voice signal. At step 131, the base station receiver receives a signal from multiple users including an E-DPDCH signal from User-1, User-2's low power voice signal, and User-2's own E-DPDCH signal. At step 132, User-2's E-DPDCH signal is demodulated, and its contribution is subtracted from the received signal. At step 133, the E-DPDCH signal from User-1 is demodulated, and a CRC checksum is formed. At step 134, it is determined whether the CRC for User-1's E-DPDCH signal checks. If not, the process moves to step 135 where the contribution of User-1's E-DPDCH signal is retained. At step 136, the voice demodulator for the User-2 signal utilizes a G-Rake receiver to estimate interference statistics associated with User-1. Thereafter, at step 137, the voice demodulator for the User-2 signal utilizes the statistics to suppress the signal from User-1.

However, if the CRC for User-1's E-DPDCH signal checks, the process moves to step 138 where the contribution of User-1's E-DPDCH signal is removed from the received signal. At step 139, the voice demodulator for the User-2 signal then adjusts the parameters of the G-Rake receiver to exclude the contributions of the E-DPDCH signal from User-1 and User-2's E-DPDCH signal. The voice demodulator for the User-2 signal can then use its G-Rake receiver and noise covariance matrix to suppress other interference, but does not have to suppress User-1 or User-2's E-DPDCH signal. Thus, at step 140, the voice demodulator for the User-2 signal utilizes the G-Rake receiver to estimate interference statistics associated with the remaining interference. At step 141, the voice demodulator for the User-2 signal utilizes the statistics to suppress the signal from the remaining interference.

Figure 14:
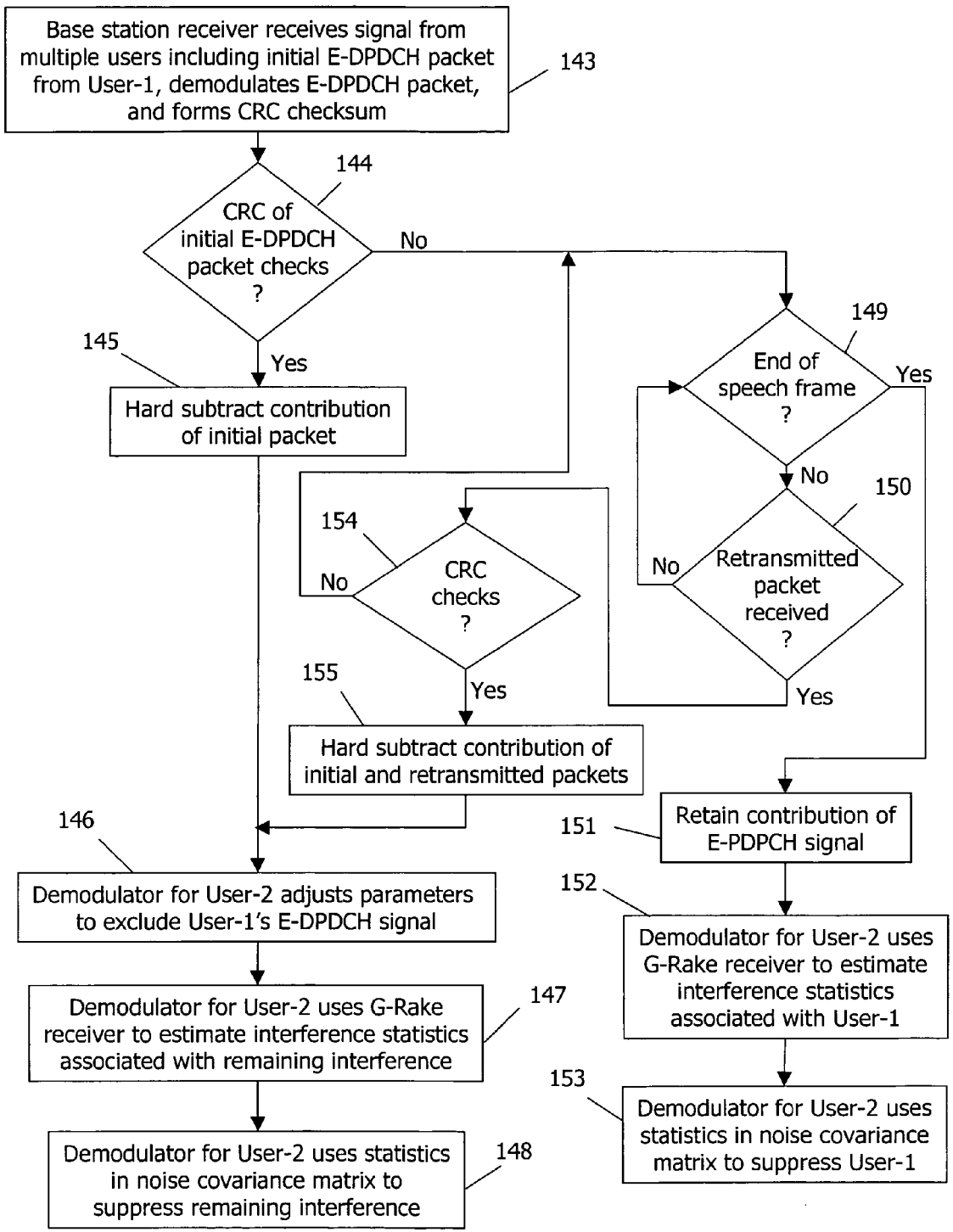
FIG. 14 is a flow diagram illustrating a seventh embodiment of the method of the present invention.

FIG. 14 is a flow diagram illustrating a seventh embodiment of the method of the present invention. In this embodiment, Automatic Repeat Request (ARQ) is utilized for the E-DPDCH packets, and if an initial E-DPDCH packet is not received correctly, the receiver CRC checks as many retransmitted packets as it can within the current speech frame. If the CRC of a retransmitted packet checks before the end of the current speech frame, the receiver then subtracts the contribution of the initial E-DPDCH packets and the retransmitted packets from the received signal, and processes the residual signal. If a retransmitted packet is not correctly received before the end of the current speech frame, the contribution of the E-DPDCH signal is retained and suppressed utilizing a G-Rake receiver and noise covariance matrix. The duration of the speech frame depends on how long the receiver can wait before it has to demodulate the data. A speech frame may correspond to several slots or frames, which can have different duration.

At step 143, a base station receiver receives a signal from multiple users including an initial E-DPDCH packet from User-1, demodulates the initial E-DPDCH packet, and forms a CRC checksum. At step 144, a CRC check is performed on the initial E-DPDCH packet to determine whether it was correctly received. If the initial packet was correctly received, the process moves to step 145 where the contribution of the initial E-DPDCH packet is hard-subtracted from the received signal. At step 146, the demodulator for the User-2 signal adjusts the parameters of the G-Rake receiver to exclude User'1's E-DPDCH signal. At step 147, the demodulator for the User-2 signal utilizes the G-Rake receiver to estimate interference statistics associated with the remaining interference. At step 148, the demodulator for the User-2 signal utilizes the statistics to suppress the signal from the remaining interference.

However, if the CRC does not check for the initial E-DPDCH packet at step 144, the process moves to step 149 where it is determined whether the current speech frame has ended. If the speech frame has ended, the process moves to step 151 where the contribution of User-1's E-DPDCH signal is retained. At step 152, the demodulator for the User-2 signal utilizes the G-Rake receiver to estimate interference statistics associated with User-1. Thereafter, at step 153, the demodulator for the User-2 signal utilizes the estimated interference statistics to suppress the signal from User-1. If the current speech frame has not ended, the process moves from step 149 to step 150 and determines whether a retransmitted packet has been received for the incorrectly received initial E-DPDCH packet. If a retransmitted packet has not been received, the process loops to step 149 and waits for either a retransmitted packet to be received or for the current speech frame to end.

However, if a retransmitted packet is received at step 150, the process moves to step 154 where a CRC check is performed to determine whether the retransmitted packet was correctly received. If not, the process returns to step 149 where, if the current speech frame has not ended, the process waits for either a retransmitted packet to be received or for the current speech frame to end. However, if the CRC for the retransmitted packet checks, the process moves to step 155 where the contributions of the initial E-DPDCH packet and the retransmitted packet(s) are subtracted from the received signal. The process then moves to step 146 and performs steps 146-148.

Figure 15:
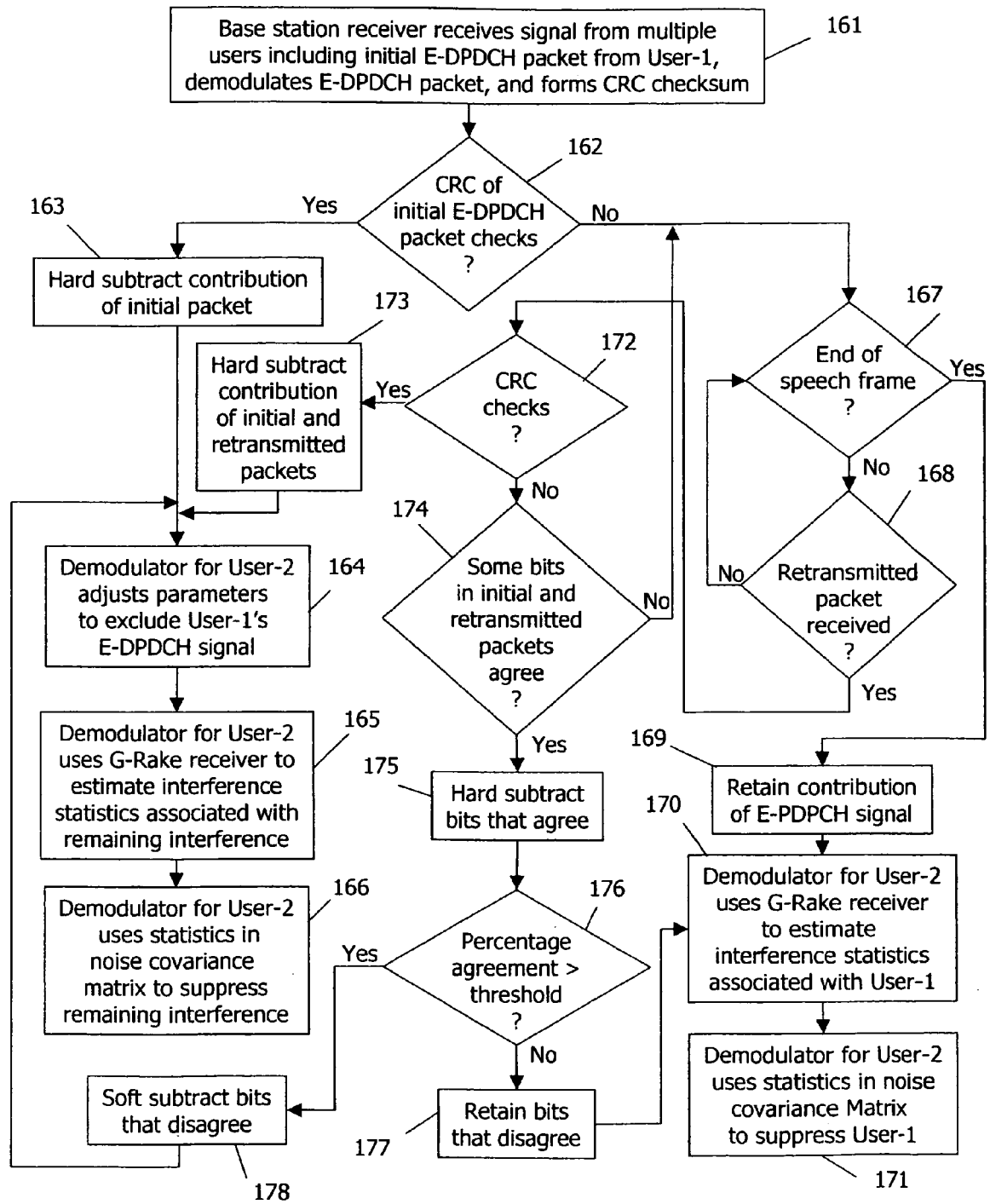
FIG. 15 is a flow diagram illustrating an eighth embodiment of the method of the present invention.

FIG. 15 is a flow diagram illustrating an eighth embodiment of the method of the present invention. In this embodiment, ARQ is again utilized for the E-DPDCH packets, and if an initial E-DPDCH packet is not received correctly, the receiver CRC checks as many retransmitted packets as it can within the current speech frame. If no retransmitted packet is correctly received, but some bits in the initial packet and the retransmitted packet agree, the receiver may subtract the bits that agree. This may be a hard or soft subtraction. If most of the bits agree, the receiver may also soft subtract the bits that disagree.

At step 161, a base station receiver receives a signal from multiple users including an initial E-DPDCH packet from User-1, demodulates the initial E-DPDCH packet, and forms a CRC checksum. At step 162, a CRC check is performed on the initial E-DPDCH packet to determine whether it was correctly received. If the initial packet was correctly received, the process moves to step 163 where the contribution of the initial E-DPDCH packet is hard-subtracted from the received signal. At step 164, the demodulator for the User-2 signal adjusts the parameters of the G-Rake receiver to exclude User'1's E-DPDCH signal. At step 165, the demodulator for the User-2 signal utilizes the G-Rake receiver to estimate interference statistics associated with the remaining interference. At step 166, the demodulator for the User-2 signal utilizes the statistics to suppress the signal from the remaining interference.

However, if the CRC does not check for the initial E-DPDCH packet at step 162, the process moves to step 167 where it is determined whether the current speech frame has ended. If the speech frame has ended, the process moves to step 169 where the contribution of User-1's E-DPDCH signal is retained. At step 170, the demodulator for the User-2 signal utilizes the G-Rake receiver to estimate interference statistics associated with User-1. Thereafter, at step 171, the demodulator for the User-2 signal utilizes the statistics to suppress the signal from User-1. If the current speech frame has not ended at step 167, the process moves to step 168 and determines whether a retransmitted packet has been received for the incorrectly received initial E-DPDCH packet. If a retransmitted packet has not been received, the process loops to step 167 and waits for either a retransmitted packet to be received or for the current speech frame to end.

However, if a retransmitted packet has been received at step 168, the process moves to step 172 where a CRC check is performed to determine whether the retransmitted packet was correctly received. If the CRC checks, the process moves to step 173 where the contribution of both the initial E-DPDCH packet and the retransmitted packet are hard-subtracted from the received signal. The process then moves to step 164 and performs steps 164-166.

However, if the CRC of the retransmitted packet does not check at step 172, the process moves to step 174 where it is determined whether some of the bits in the initial E-DPDCH packet and the retransmitted packet agree. If not, the process returns to step 167 and waits for either a retransmitted packet to be received or for the current speech frame to end. However, if some of the bits in the initial E-DPDCH packet and the retransmitted packet agree at step 174, the process moves to step 175 where the receiver hard-subtracts the bits that agree. Alternatively, the bits that agree may be soft-subtracted. The process then moves to step 176 where it is determined whether the percentage of bits in agreement exceeds a predefined threshold. If not, the bits that disagree are retained at step 177. The process then moves to step 170 and performs steps 170 and 171. It is preferable to perform steps 170 and 171 for the bits that disagree, and to perform steps 164-166 for the bits that agree and were subtracted.

However, if the percentage of bits in agreement exceeds the predefined threshold at step 176, the process moves to step 178 where the bits that disagree are soft-subtracted. The process then returns to step 164 and performs steps 164-166.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. In a radio receiver, a method of canceling interference from a first user signal received in a combined signal that includes a contribution from a first user and a second user, wherein the first user signal is a high power signal, and the second user signal is a low power signal relative to the first user signal, said method comprising the steps of:
   determining whether the first user signal was correctly received, wherein the first user signal includes a cyclic redundancy check (CRC) checksum, and the step of determining whether the first user signal was correctly received includes determining whether the CRC checksum is correct; and
   removing the contribution of the first user signal from the received combined signal only upon determining that the first user signal was correctly received, wherein the CRC checksum includes a plurality of bits, each bit having a value, and the step of removing the contribution of the first user signal includes:
      hard-subtracting the contribution of the first user signal from the received signal if all of the bits of the checksum are correct; and
      soft-subtracting the contribution of the first user signal from the received signal if some of the bits in the checksum are not correct.

2. The method of claim 1, wherein the method also includes reconstructing the first user signal upon determining that the CRC checksum is correct prior to removing the contribution of the first user signal.

3. In a radio receiver, a method of canceling interference from a first user signal received in a combined signal that includes a contribution from a first user and a second user, wherein the first user signal is a high power signal, and the second user signal is a low power signal relative to the first user signal, said method comprising the steps of:
   determining whether the first user signal was correctly received; and
   removing the contribution of the first user signal from the received combined signal only upon determining that the first user signal was correctly received;
   wherein both the first user signal and the second user signal belong to a single user that transmits on both a high power, high data rate channel and a lower power channel, and the method further comprises:
   re-encoding the high power signal to create symbols; and
   utilizing the symbols of the high power signal as pilot symbols to improve channel coefficient estimation to help detect the lower power signal coming from the same user.

4. In a radio receiver, a method of canceling interference from a first user signal received in a combined signal that includes a contribution from a first user and a second user, said method comprising:
   determining whether the first user signal was correctly received; and
   removing the contribution of the first user signal from the received combined signal only upon determining that the first user signal was correctly received;
   wherein the receiver is a generalized Rake (G-Rake) receiver, and the combined signal includes contributions from a plurality of signals of varying power levels, wherein the first user signal is the highest power signal, and the method further comprises:
   adjusting parameters of the G-Rake receiver to exclude the first user signal;
   estimating interference statistics associated with the remaining interference; and
   utilizing the estimated interference statistics to suppress the remaining interference.

5. The method of claim 4, further comprising:
   retaining the contribution of the first user signal upon determining that the first user signal was not correctly received;
   estimating interference statistics associated with the first user signal; and
   utilizing the estimated interference statistics to suppress the first user signal.

6. In a generalized Rake (G-Rake) receiver, which processes a low power signal from a given user, a method of canceling interference from high power signals received in a combined signal that includes contributions from a plurality of signals of varying power levels, wherein the signals include a high power signal from an interfering user, the low power signal from the given user, and a high power signal from the given user, said method comprising:
   initially demodulating the given user's high power signal and removing the contribution of the given user's high power signal from the received signal;
   determining whether the interfering user's high power signal was correctly received;
   upon determining that the interfering user's high power signal was not correctly received:
      estimating interference statistics associated with the interfering user's high power signal; and
      utilizing the statistics to suppress the interfering user's high power signal in a demodulation of the given user's low power signal; and
   upon determining that the interfering user's high power signal was correctly received:
      removing the contribution of the interfering user's high power signal from the received signal;

estimating interference statistics associated with the remaining interference; and utilizing the estimated interference statistics to suppress the remaining interference in a demodulation of the given user's low power signal.

7. In a receiver, a method of canceling interference from a highest power signal received in a combined signal that includes contributions from a plurality of signals of varying power levels, wherein the highest power signal is transmitted in compliance with a data transmission protocol that utilizes automatic repeat request (ARQ) to retransmit data packets that are not correctly received, said method comprising the steps of:

determining whether a highest power data packet was correctly received after the ARQ process;

upon determining that the highest power data packet was correctly received, removing the contribution of multiple ARQ transmissions associated with the highest power data packet from the received signal;

adjusting parameters of a G-Rake receiver to exclude the contribution of the highest power data packet;

estimating interference statistics associated with the remaining interference; and utilizing the estimated interference statistics to suppress the signal from the remaining interference.

8. In a receiver, a method of canceling interference from a highest power signal received in a combined signal that includes contributions from a plurality of signals of varying power levels, wherein the highest power signal is transmitted in compliance with a data transmission protocol that utilizes automatic repeat request (ARQ) to retransmit data packets that are not correctly received, said method comprising:

determining whether a highest power data packet was correctly received after the ARQ process;

upon determining that the highest power data packet was correctly received, removing the contribution of multiple ARQ transmissions associated with the highest power data packet from the received signal;

upon determining that the highest power data packet was not correctly received, determining whether a retransmitted highest power packet was correctly received;

upon determining that the retransmitted highest power packet was not correctly received, determining whether additional retransmitted highest power packets are received before the end of the concurrent speech frame;

if additional retransmitted highest power packets are received before the end of the concurrent speech frame, determining whether one of the additional retransmitted highest power packets was correctly received; and if one of the additional retransmitted highest power packets was correctly received, removing the contribution of the initial highest power data packet, the correctly received retransmitted highest power packet, and any intervening retransmitted highest power packets from the received signal prior to further processing.

9. The method of claim 8, wherein if the concurrent speech frame ends before a retransmitted highest power packet is correctly received, the method includes:

retaining the contribution of the highest power signal in the received signal;

estimating interference statistics associated with the highest power signal; and utilizing the estimated interference statistics to suppress the highest power signal.

10. In a receiver, a method of canceling interference from a highest power signal received in a combined signal that includes contributions from a plurality of signals of varying power levels, wherein the highest power signal is transmitted in compliance with a data transmission protocol that utilizes automatic repeat request (ARQ) to retransmit data packets that are not correctly received, said method comprising:

determining whether a highest power data packet was correctly received after the ARQ process;

upon determining that the highest power data packet was correctly received, removing the contribution of multiple ARQ transmissions associated with the highest power data packet from the received signal;

wherein if the retransmitted highest power packet was not correctly received, the method includes:

determining whether some bits in the initial highest power data packet and the retransmitted highest power packet agree; and if some of the bits agree, subtracting the bits that agree prior to further processing.

11. The method of claim 10, further comprising, after subtracting the bits that agree, the steps of:

determining whether a percentage of bits that agree is above a predefined threshold; and if the percentage of bits that agree is above the predefined threshold, soft-subtracting the bits that do not agree prior to further processing.

12. The method of claim 11, wherein if the percentage of bits that agree is not above the predefined threshold, the method includes:

retaining the bits that do not agree in the received signal;

estimating interference statistics associated with the bits that do not agree in the highest power signal; and utilizing the estimated interference statistics to suppress the highest power signal at locations where subtraction did not occur.

13. An apparatus in a radio receiver for canceling interference from a first user signal received in a combined signal that includes a contribution from a first user and a second user, wherein the first user signal is a high power signal and the second user signal is a low power signal relative to the first user signal, said apparatus comprising:

an error detection mechanism for determining whether the first user signal was correctly received, said error detection mechanism including:

means for forming a cyclic redundancy check (CRC) checksum for the first user signal; and means for determining whether the CRC checksum for the first user signal is correct; and subtracting means for removing the contribution of the first user signal from the received combined signal, said subtracting means removing the contribution of the first user signal only upon determining that the first user signal was correctly received, wherein the CRC checksum includes a plurality of bits, each bit having a value, and the subtracting means includes:

hard-subtracting means for hard-subtracting the contribution of the first user signal responsive to an indication from the error detection mechanism that all of the bits of the checksum are correct; and soft-subtracting means for soft-subtracting the contribution of the first user signal responsive to an indication from the error detection mechanism that some of the bits in the checksum are not correct.

14. An apparatus in a radio receiver for canceling interference from a first user signal received in a combined signal that includes a contribution from a first user and a second user, wherein the first user signal is a high power signal, and the second user signal is a low power signal relative to the first user signal, said apparatus comprising:
- an error detection mechanism for determining whether the first user signal was correctly received; and
- subtracting means for removing the contribution of the first user signal from the received combined signal, said subtracting means removing the contribution of the first user signal only upon determining that the first user signal was correctly received;
- wherein both the first user signal and the second user signal belong to a single user that transmits on both a high power, high data rate channel and a lower power voice channel, and the apparatus further comprises:
- an encoder for re-encoding the high power signal to create symbols; and
- a channel estimator that utilizes the symbols of the high power signal as pilot symbols to improve channel coefficient estimation to help detect the lower power voice signal coming from the same user.

15. An apparatus in a radio receiver for canceling interference from a first user signal received in a combined signal that includes a contribution from a first user and a second user, said apparatus comprising:
- an error detection mechanism for determining whether the first user signal was correctly received; and
- subtracting means for removing the contribution of the first user signal from the received combined signal, said subtracting means removing the contribution of the first user signal only upon determining that the first user signal was correctly received;
- wherein the receiver is a generalized Rake (G-Rake) receiver, and the combined signal includes contributions from a plurality of signals of varying power levels, wherein the first user signal is the highest power signal, and the apparatus further comprises:
- means for adjusting parameters of the G-Rake receiver to exclude the first user signal;
- a statistics estimator for estimating interference statistics associated with the remaining interference; and
- interference suppression means for suppressing the remaining interference utilizing the estimated interference statistics.

16. In a generalized Rake (G-Rake) receiver, an apparatus for canceling interference from a highest power signal received in a combined signal that includes contributions from a plurality of signals of varying power levels, wherein the highest power signal is transmitted in compliance with a data transmission protocol that utilizes automatic repeat request (ARQ) to retransmit data packets that are not correctly received, said apparatus comprising:
- error detecting means for determining whether a highest power data packet was correctly received after the ARQ process;
- subtracting means for removing the contribution of multiple ARQ transmissions associated with the highest power data packet from the received signal responsive to an indication from the error detecting means that the highest power data packet was correctly received;
- means for adjusting parameters of the G-Rake receiver to exclude the contribution of the highest power data packet;
- a statistics estimator for estimating interference statistics associated with the remaining interference; and
- interference suppression means for suppressing the remaining interference utilizing the estimated interference statistics.

17. In a receiver, an apparatus for canceling interference from a highest power signal received in a combined signal that includes contributions from a plurality of signals of varying power levels, wherein the highest power signal is transmitted in compliance with a data transmission protocol that utilizes automatic repeat request (ARQ) to retransmit data packets that are not correctly received, said apparatus comprising:
- error detecting means for determining whether a highest power data packet was correctly received after the ARQ process;
- subtracting means for removing the contribution of multiple ARQ transmissions associated with the highest power data packet from the received signal responsive to an indication from the error detecting means that the highest power data packet was correctly received;
- bit comparing means, responsive to an indication from the error detection means that a retransmitted highest power packet was not correctly received, for determining whether some bits in an initial highest power data packet and the retransmitted highest power packet agree; and
- subtracting means, responsive to an indication from the bit comparing means that some of the bits agree, for subtracting the bits that agree prior to further processing.

18. The apparatus of claim 17, wherein the bit comparing means also includes means for determining whether a percentage of bits that agree is above a predefined threshold, and the apparatus also includes:
- soft-subtracting means, responsive to an indication from the bit comparing means that the percentage of bits that agree is above the predefined threshold, for soft-subtracting the bits that do not agree prior to further processing.

19. The apparatus of claim 18, wherein the receiver is a generalized Rake (G-Rake) receiver, and the apparatus further comprises:
- a statistics estimator for estimating interference statistics associated with the bits that do not agree in the highest power signal; and
- interference suppression means for suppressing the highest power signal utilizing the estimated interference statistics at locations where subtraction did not occur.

* * * * *

UNITED STATES PATENT AND TRADEMARK OFFICE
CERTIFICATE OF CORRECTION

PATENT NO. : 7,389,099 B2  
APPLICATION NO. : 11/112578  
DATED : June 17, 2008  
INVENTOR(S) : Cozzo et al.

Page 1 of 1

It is certified that error appears in the above-identified patent and that said Letters Patent is hereby corrected as shown below:

On the Title Page, Item (75), under "Inventors", in Column 1, Line 2, delete "Yi-Pin Wang," and insert -- Yi-Pin Eric Wang, --, therefor.

On the Title Page, Item (75), under "Inventors", in Column 1, Line 3, delete "(CH);" and insert -- (SE); --, therefor.

In Fig. 6, Sheet 4 of 10, for Tag "68", Line 2, delete "E-PDPCH" and insert -- E-DPDCH --, therefor.

In Fig. 14, Sheet 9 of 10, for Tag "151", Line 2, delete "E-PDPCH" and insert -- E-DPDCH --, therefor.

In Fig. 15, Sheet 10 of 10, for Tag "169", Line 2, delete "E-PDPCH" and insert -- E-DPDCH --, therefor.

Signed and Sealed this

Thirtieth Day of December, 2008

JON W. DUDAS  
*Director of the United States Patent and Trademark Office*